United States Patent [19]
Tang et al.

[11] Patent Number: 5,204,785
[45] Date of Patent: Apr. 20, 1993

[54] ARTICULATED ARM WITH SHOULDER JOINT

[75] Inventors: Kenneth Y. Tang, La Jolla; Murray R. Dunn, Carlsbad; William G. Hulburd, San Diego, all of Calif.

[73] Assignee: Thermo Electron Technologies Corp., San Diego, Calif.

[21] Appl. No.: 886,039

[22] Filed: May 19, 1992

Related U.S. Application Data

[63] Continuation-in-part of Ser. No. 618,645, Nov. 27, 1990, Pat. No. 5,115,355.

[51] Int. Cl.⁵ .............................................. G02B 7/182
[52] U.S. Cl. .................................... 359/876; 359/857; 359/196
[58] Field of Search ............... 359/876, 857, 850, 196; 250/206

[56] References Cited

U.S. PATENT DOCUMENTS

| | | | |
|---|---|---|---|
| 4,256,364 | 3/1981 | Minoura et al. | 359/876 |
| 4,300,160 | 11/1981 | Pusch et al. | 359/876 |
| 4,678,289 | 7/1987 | Mattelin et al. | 359/876 |
| 4,883,348 | 11/1989 | Spivey et al. | 359/857 |

Primary Examiner—Loha Ben
Attorney, Agent, or Firm—John R. Ross

[57] ABSTRACT

An articulated arm comprising at least one compact Coude optics system simulating a shoulder joint. In this Coude optics system, two mirrors rotate on one gimbal axis and the other two mirror pivot on the other gimbal axis. The axis of the two gimbals intersect and light beams passing through the system effectively are turned at this point of intersection at a desired angle.

4 Claims, 3 Drawing Sheets

ARTICULATED ARM WITH SHOULDER JOINT

This invention is a continuation in-part of Ser. No. 07/618,645 filed, Nov. 27, 1990, now U.S. Pat. No. 5,115,355. This invention relates to optical beam directors and in particular to Coude optics systems.

BACKGROUND OF THE INVENTION

Coude optics systems are common. These devices are used primarily in telescopic systems where the detector is in a fixed location relative to a movable telescope or as laser beam directors. Prior art Coude optics systems are described in an Article by W. L. Casey and D. D. Phinney published in Society of Photo Optical Instrumentation Engineering, Vol. 887 Acquisition, Tracking and Pointing. That article describes 32 Coude optics systems. In none of these systems does the beam pass through one single point of rotation. A Coude optics system was disclosed by the applicant and his co-inventors but not claimed in U.S. Pat. No. 4,883,348 issued Nov. 28, 1989. The Coude optics system is claimed in U.S. Pat. No. 5,115,355.

Articulated arms are commonly used in laser medicine in order to direct laser beams on the patient. These devices are especially important for certain laser beams such as $CO_2$ beams which cannot be well transmitted through fiber optics devices.

SUMMARY OF THE INVENTION

The present invention provides an articulated arm comprising at least one compact Coude optics system simulating a shoulder joint. In this Coude optics system, two mirrors rotate on one gimbal axis and the other two mirrors pivot on another gimbal axis. The axes of the two gimbals intersect and light beams passing through the system effectively are turned at this point of intersection at a desired angle.

DETAILED DESCRIPTION OF PREFERRED EMBODIMENTS

Figure 1:
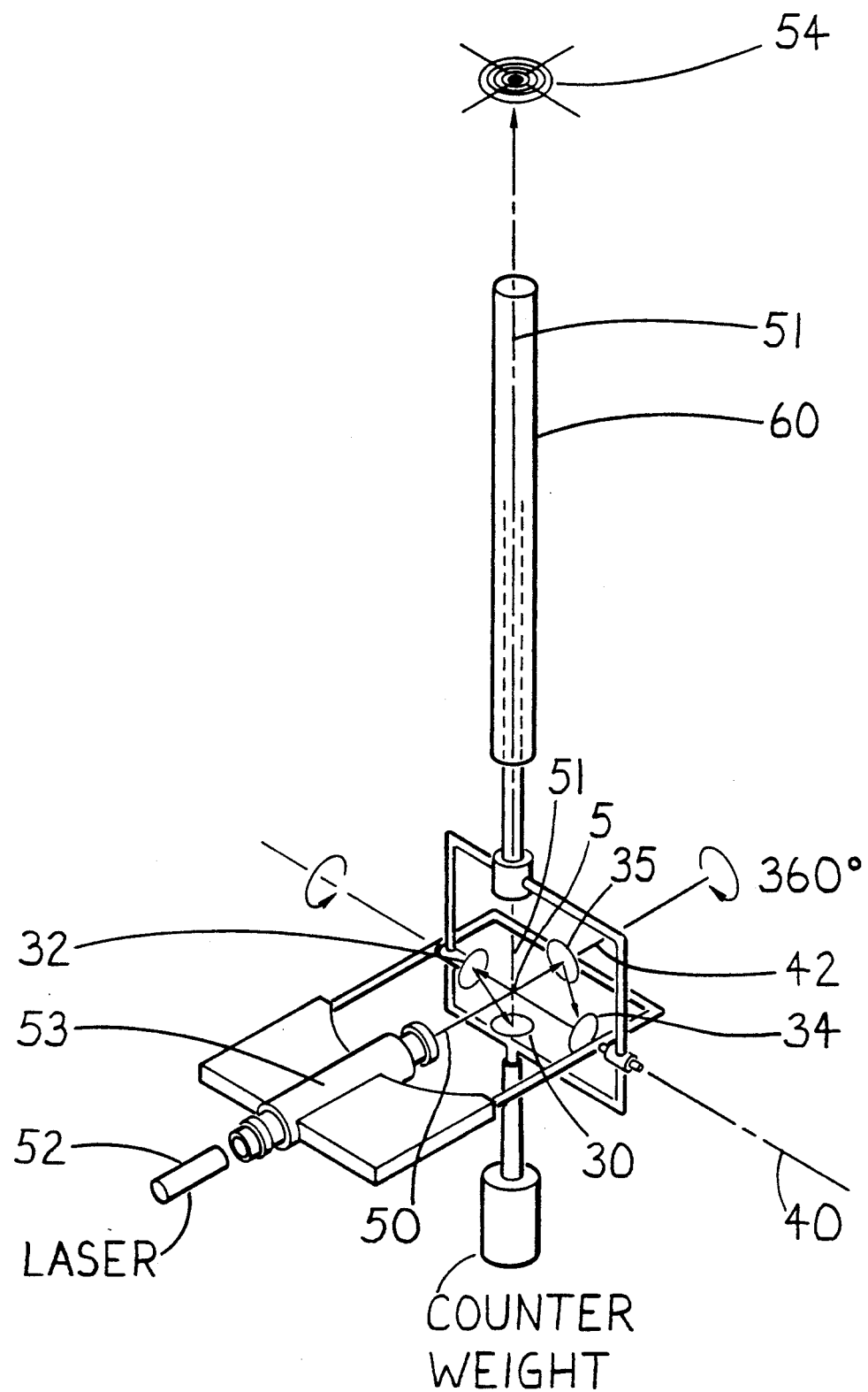
FIG. 1 is a sketch showing a preferred embodiment of the present invention with one shoulder joint.

Most existing articulated arms used in laser medicine consists of a series of right angle joints (containing a single mirror) each of which joints typically turn the laser beam 90° from its original path. The joint can be rotated about the axis of the original beam so that the beam can be directed in any direction in the plane perpendicular to the original beam at the point of intersection of the beam with the joint's mirror. Such a joint is shown at 60 in FIG. 2 U.S. Pat. No. 5,115,355 will describe in detail a Coude optics system which provides an optical joint in which the beam can be turned at any angle except small angles in the direction of the original beam and small angles in the direction opposite the direction of the original beam. The present invention provides an articulated arm which utilizes the Coude optics device described in U.S. Pat. No. 5,115,355. It can be described by reference to FIGS. 1, 2 and 3. The device simulates a human shoulder joint, except for the straight out position and it is referred to hereinafter as a "shoulder joint". The system shown in FIG. 1 consists of four mirrors 30, 32, 34 and 35. Mirror 30 and 32 are fixed with respect to each other and these two mirrors rotate about axis 40 which is in line with respective centers of mirrors 32 and 34. Mirror 34 and 35 are fixed with respect to each other and supported on a frame attached to bearing 53. These two mirrors rotate about an axis 42 which is in line with respective centers of mirror 35 and laser 52. The faces of mirrors 30 and 32 make an angle of 45° relative to each other and the faces of mirrors 35 and 34 make an angle of 45° relative to each other.

Narrow light beam 50 from laser 52 reflects off mirror 35 to mirror 34 to mirror 32 to mirror 30 and as outgoing beam 51 passes through directioning arm 60 to target 54. The beam will be directed in whatever directioning arm 60 is pointed. In this embodiment arm 60 is a telescope arm so that the end of the arm can be brought close to the target area. Both the incoming beam 50 and outgoing beam 51 always pass through the center of rotation 5 of the Coude optics system no matter in which direction the system is pointing beam 51. This center of rotation is the intersection of axis 40 and axis 42. Counter weight 62 counters the weight of telescope arm 60. Coude optics system described in FIG. 1 can be pointed in any direction except within a few degrees of the direction of axis 42.

Figure 2:
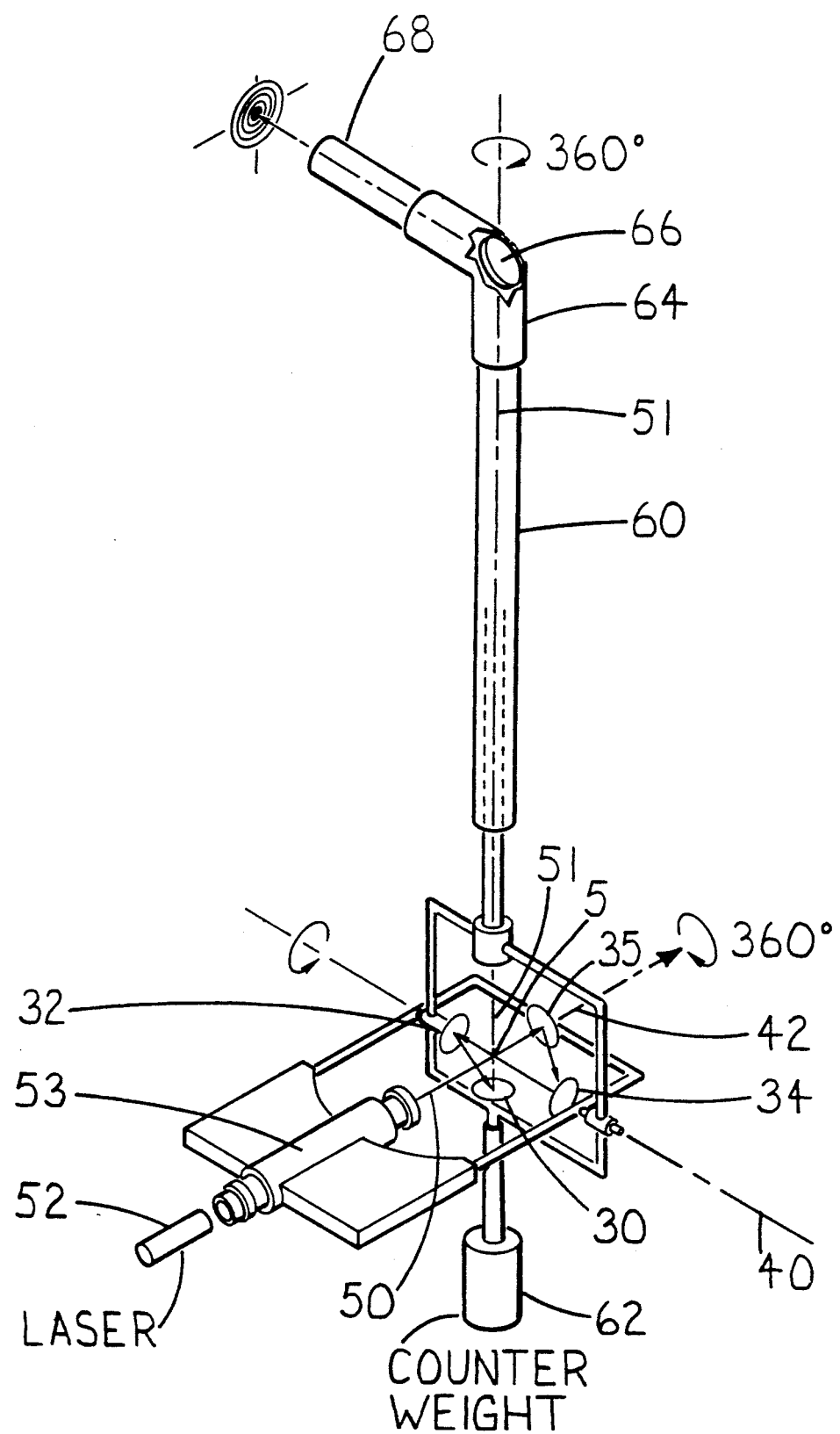
FIG. 2 is a drawing of a preferred embodiment of the present invention with one shoulder joint and a right angle joint.

FIG. 2 shows another preferred embodiment. It is exactly the same as the embodiment shown in FIG. 1 except a right angle joint 64 is provided which rotates the beam 360° around the axis of telescope arm 60. It contains a mirror 66 mounted at an angle of 45° to the axis of telescope arm 60 and the axis of short arm 68.

Figure 3:
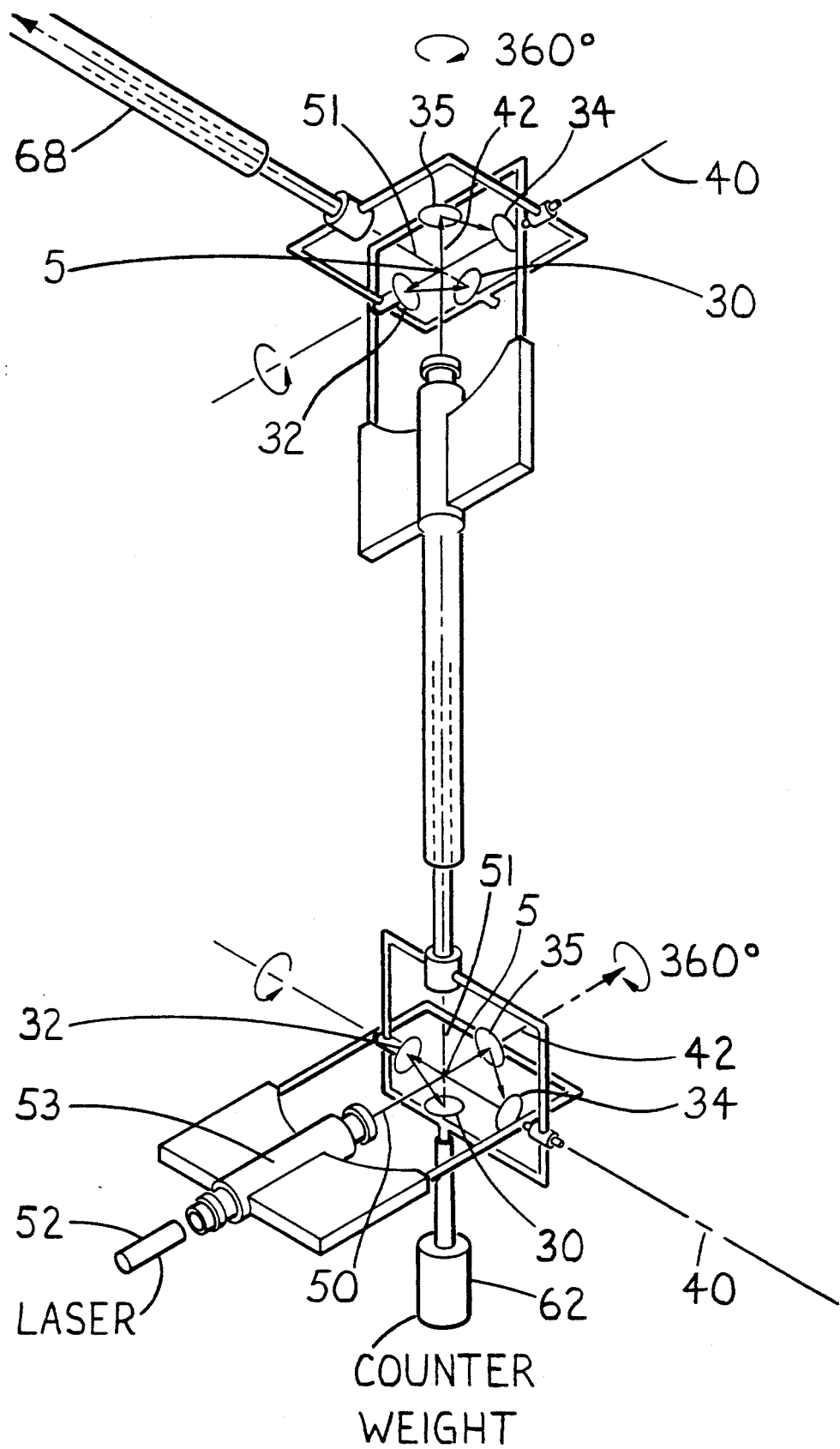
FIG. 3 is a drawing of a preferred embodiment of the present invention with two shoulder joints.

FIG. 3 shows a third preferred embodiment. This embodiment contains two shoulder joint type optics elements.

While the above description contains many specificities, the reader should not construe these as limitations on the scope of this invention, but merely as exemplifications of preferred embodiments thereof. Those skilled in the art will envision many other possible variations which are within its scope.

Accordingly, the reader is requested to determine the scope of the invention by the appended claims and their legal equivalents, and not by the examples which have been given.

I claim:

1. An articulated arm for directing a laser beam comprising:
    at least one Coude optics system, each such system comprising a two axis gimbal system defining a first axis and a second axis, said first axis intersecting said second axis at a point defining a Coude center of rotation,
    a first mirror,
    a second mirror,
    a third mirror and
    a fourth mirror;
    said first and second mirrors being fixed with respect to each other and arranged to rotate about said first axis, said third and fourth mirrors being fixed with respect to each other and arranged to rotate about said second axis;
    said mirrors being positioned so as to permit a light beam entering said system along said first axis to be reflected off each mirror in turn and directed to various targets within a wide field of regard by appropriate movement of the two axis gimbal system;

at least one directioning arm means through which said beam is directed.

2. An articulated arm as in claim 1 wherein said at least one directioning arm means is a telescoping arm.

3. An articulated arm as in claim 1 and further comprising a 90° optics means for turning said laser beam.

4. An articulated arm as in claim 1 wherein said at least one Coude optics system is two said Coude optics systems.

* * * * *